INVENTORS
DANIEL M. SCHWARTZ &
THEODORE N. HACKETT

BY Stowell + Evans

ATTORNEYS

Jan. 3, 1956　　　T. N. HACKETT ET AL　　　2,729,348
MATERIAL HANDLING MACHINE

Filed June 7, 1951　　　　　　　　　　　　11 Sheets-Sheet 3

INVENTORS
DANIEL M. SCHWARTZ
&
THEODORE N. HACKETT
BY Stowell + Evans
ATTORNEYS

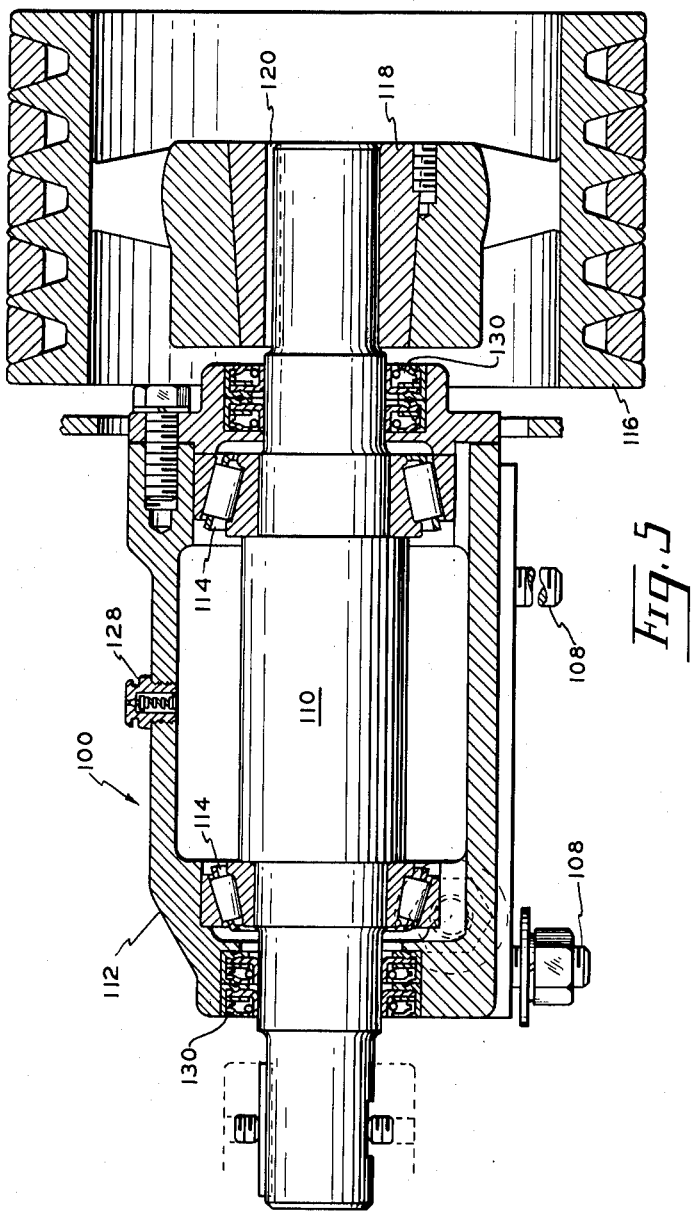

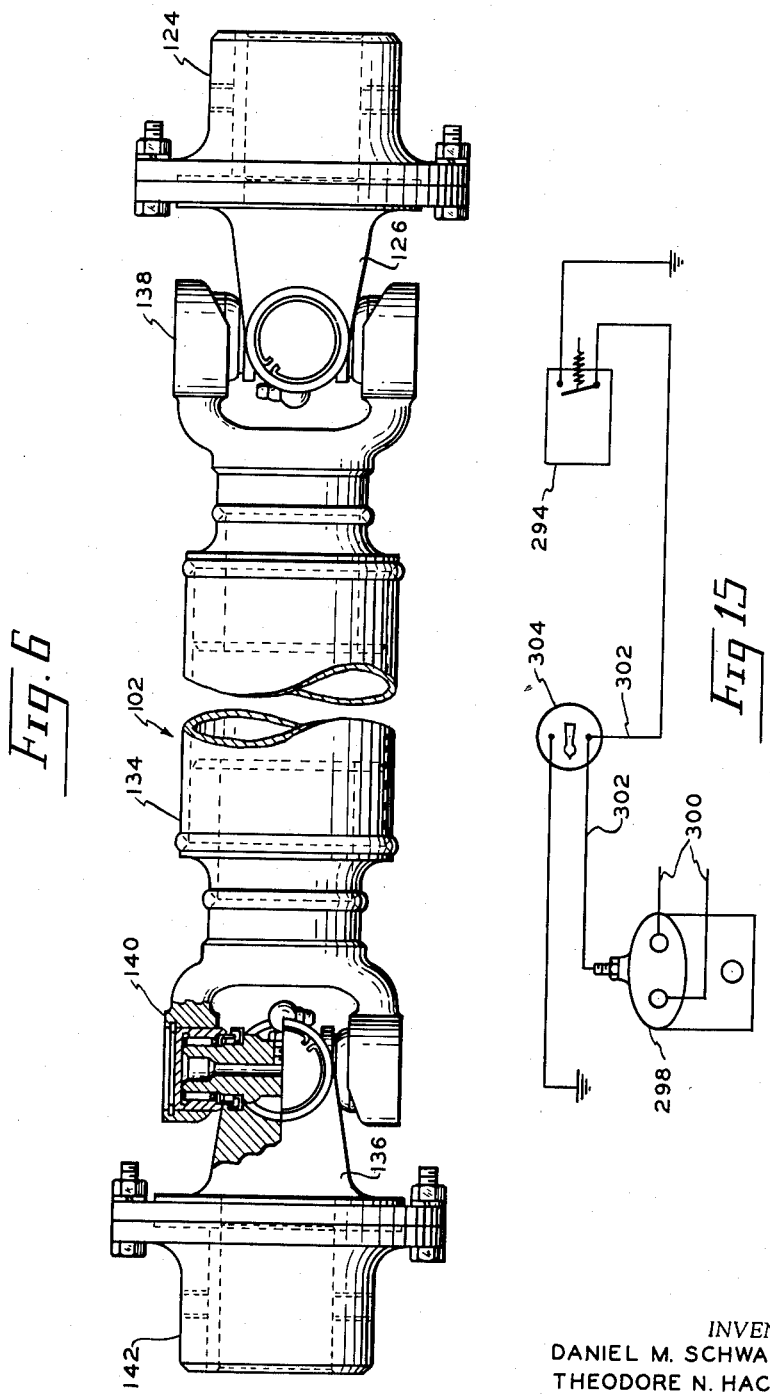

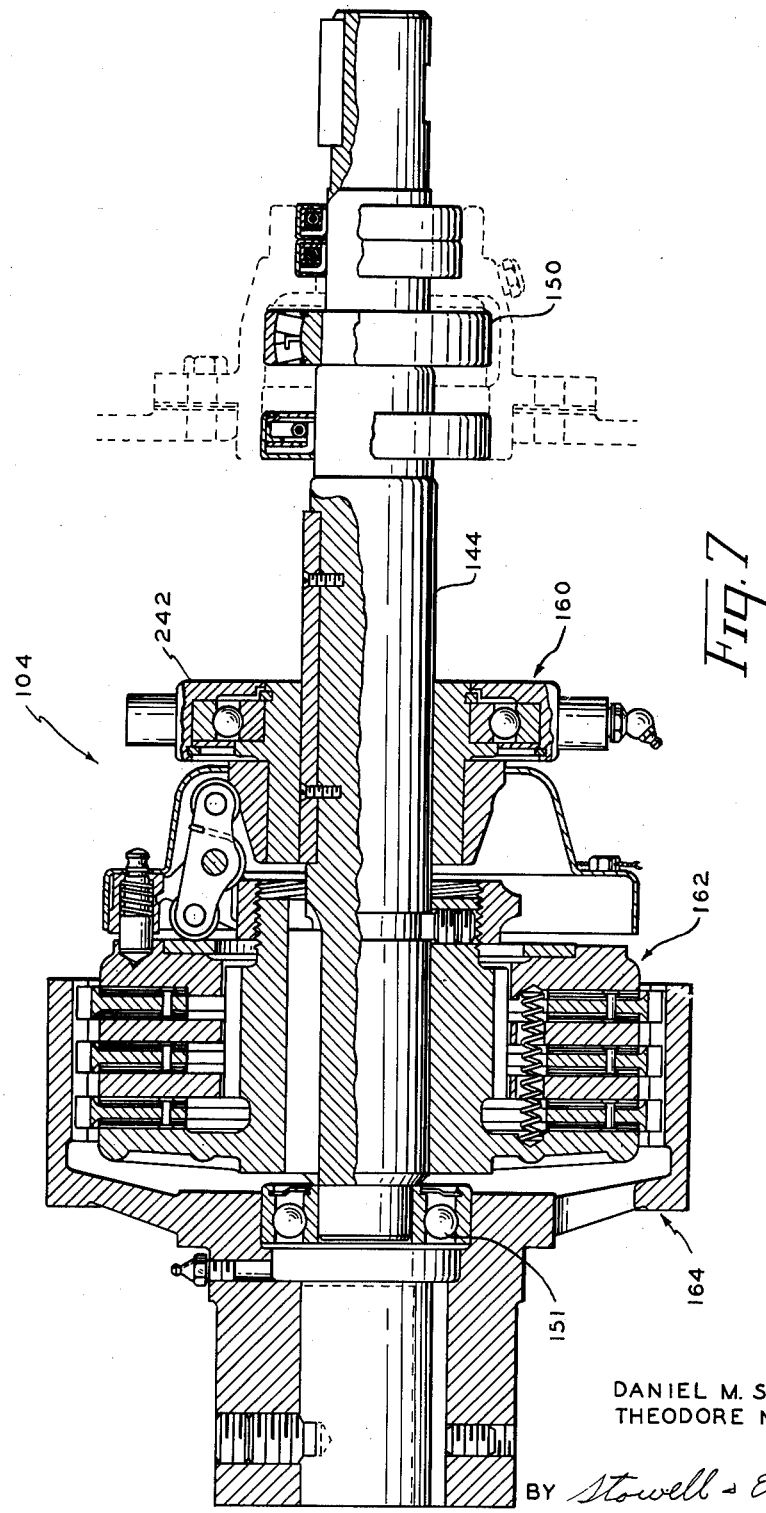

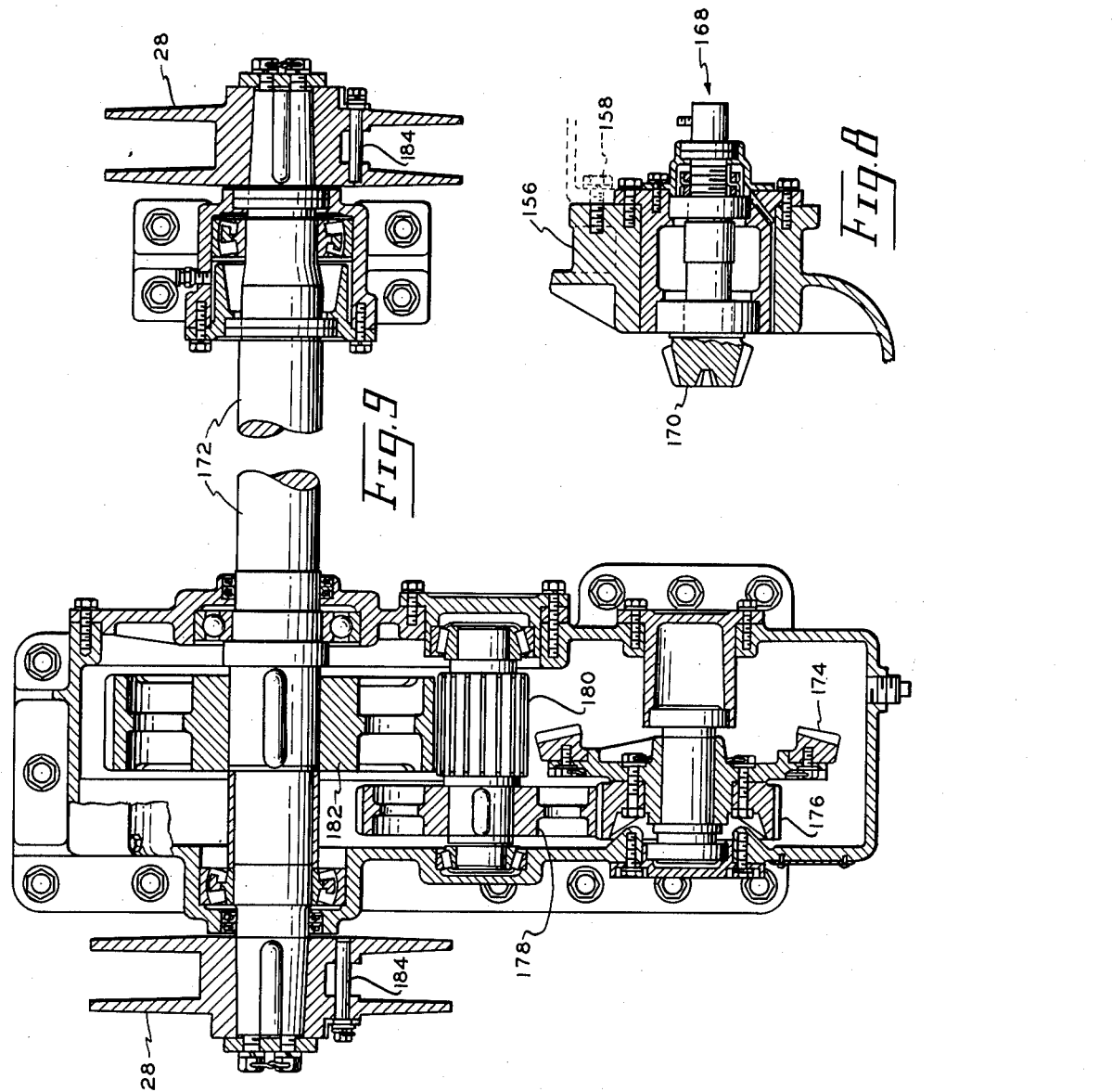

Jan. 3, 1956 T. N. HACKETT ET AL 2,729,348
MATERIAL HANDLING MACHINE
Filed June 7, 1951 11 Sheets-Sheet 8
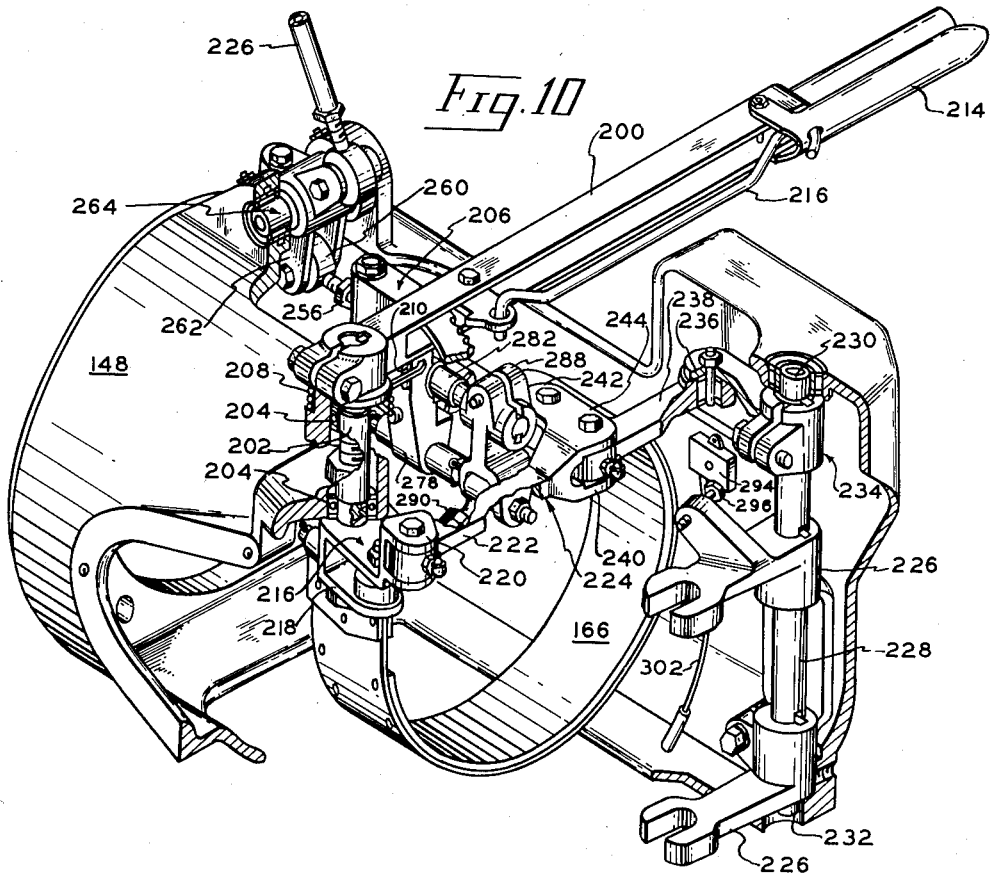
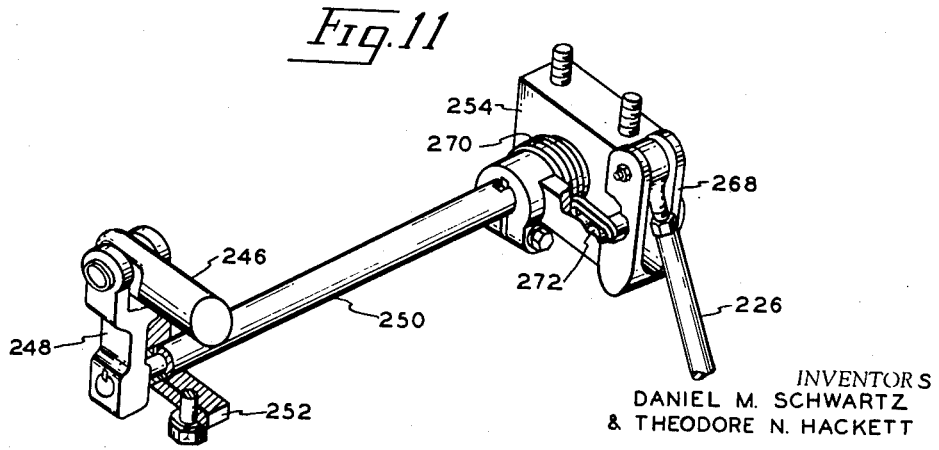
INVENTORS
DANIEL M. SCHWARTZ
& THEODORE N. HACKETT
BY 
ATTORNEYS

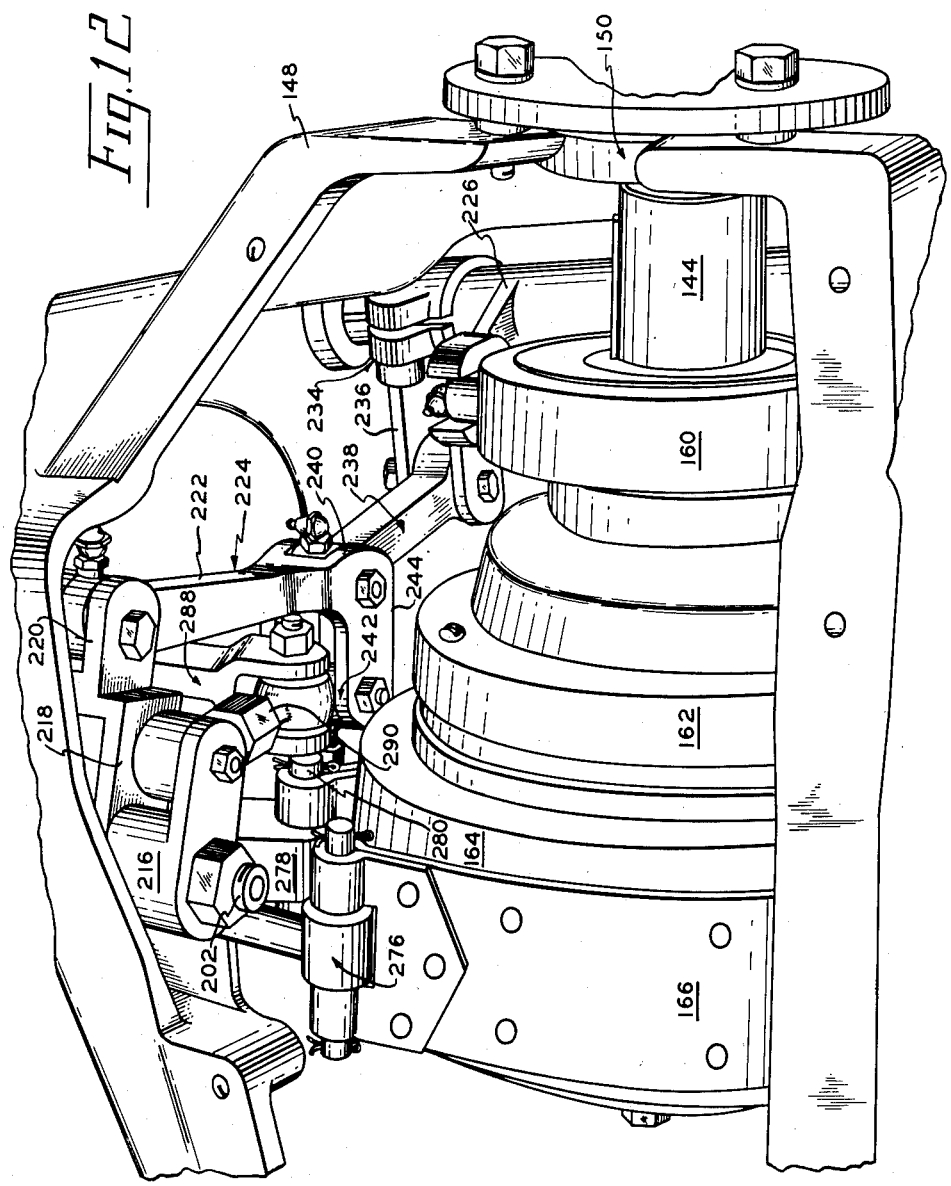

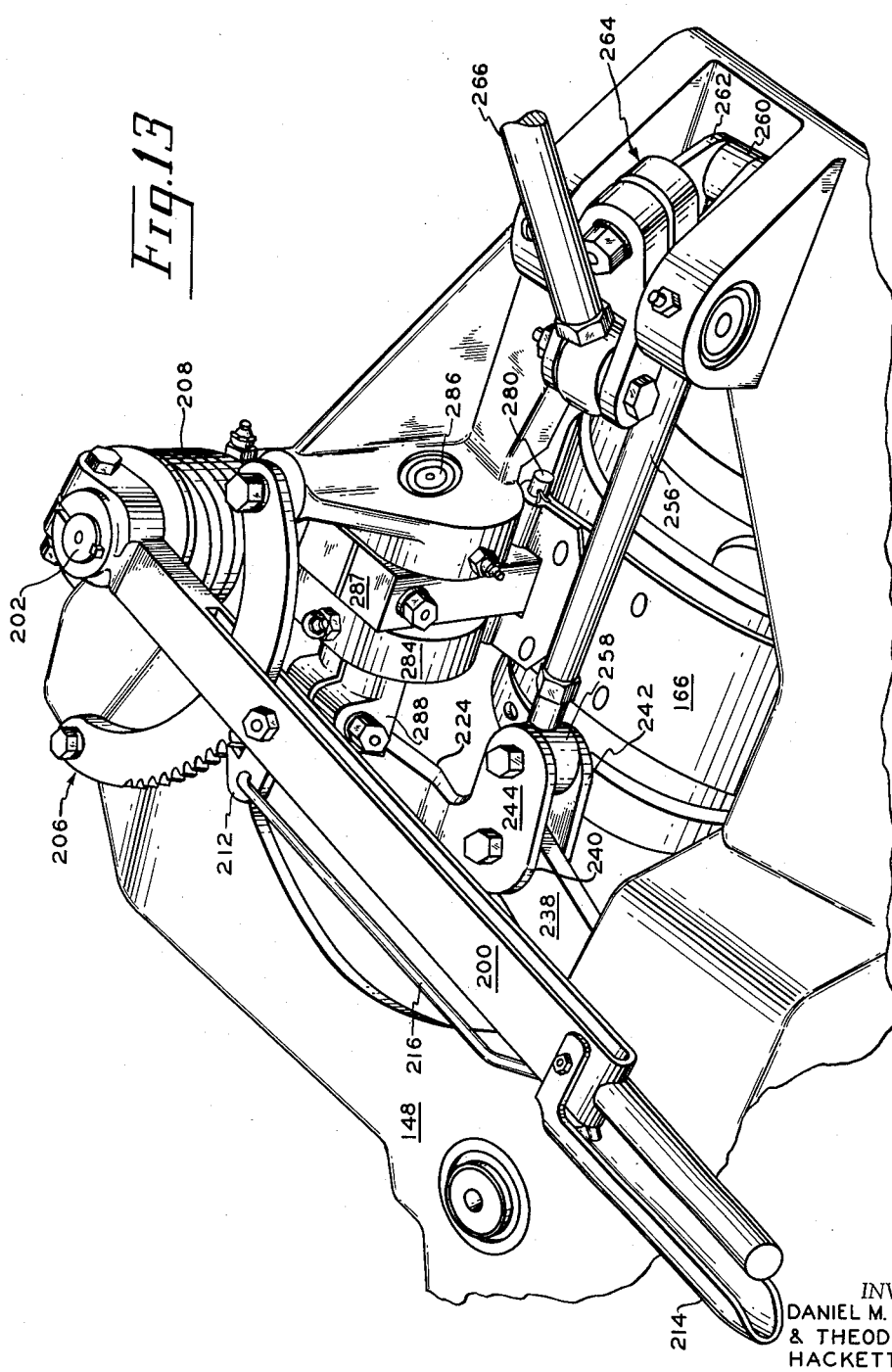

Jan. 3, 1956   T. N. HACKETT ET AL   2,729,348
MATERIAL HANDLING MACHINE

Filed June 7, 1951   11 Sheets-Sheet 11

INVENTORS
DANIEL M. SCHWARTZ
& THEODORE N. HACKETT

BY *Stowell & Evans*

ATTORNEYS

United States Patent Office 2,729,348
Patented Jan. 3, 1956

2,729,348

MATERIAL HANDLING MACHINE

Theodore N. Hackett and Daniel M. Schwartz, Salt Lake City, Utah, assignors to The Eimco Corporation, Salt Lake City, Utah, a corporation of Utah Application June 7, 1951, Serial No. 230,365

6 Claims. (Cl. 214—131)

This invention relates to material handling machines and particularly to improvements in bulk handling machines having an overhead material handling bucket.

The machine of the invention provides a rugged self-propelled device adapted to load and handle bulk material under a wide variety of conditions.

An object of the invention is the provision of such a device for lifting, transporting, and loading bulk materials in substantial capacities.

A further object of the invention is to provide a material handling machine of the type described having a self-contained material handling frame, and superstructure which is readily removable for repairs and maintenance of the machine.

Another object of the invention is the provision of such a device comprising a main frame, a prime mover carried by the frame, an overhead material handling structure mounted for rolling engagement on the frame from a depressed material gathering position at one end of the vehicle to an elevated material dumping position at the other end of the vehicle, the material handling structure comprising paired rocker arms having curved surfaces adapted for rolling engagement on the vehicle frame, and a shovel bucket carried by the rocker arms, a bumper frame supported by the vehicle at its rearward end adapted to be engaged by the rocker arms in the material dumping position of the shovel bucket, drive means for transmitting motion from the prime mover to the overhead material handling structure, the drive means comprising a clutch unit including a driver member and a driven member, brake means for the driven clutch member, interdependent control means for said clutch and brake selectively operable to engage the clutch members and disengage the brake and to disengage the clutch members and engage the brake, and power cut-off means on the bumper frame operable by the material handling structure in the elevated material dumping position to disengage the clutch driver member from the driven clutch member independently of the clutch control means.

A further object is the provision of driving control means for the material handling machine comprising a clutch unit including a driver member and a driven member, and interdependent control means for said clutch and brake selectively operable to engage the clutch members and disengage the brake and to disengage the clutch members and engage the brake.

These and other objects and advantages of the invention will be apparent from the following description of a preferred embodiment of the invention with reference to the accompanying drawings in which:

Fig. 5 is an enlarged detailed view of the front power take-off assembly of the bucket drive;

Fig. 6 is an enlarged detailed view of the bucket drive shaft assembly;

Fig. 7 is an enlarged detailed view of the bucket clutch assembly;

Figs. 8 and 9 are enlarged detailed views partially in section of the bucket gear drive assembly;

Fig. 10 is a fragmentary perspective view of the bucket clutch and brake control unit;

Fig. 11 is a fragmentary perspective view of the upper power cut-off mechanism;

Fig. 12 is a fragmentary perspective view of the bucket clutch and brake unit installed in the control unit shown in Fig. 10 of the drawing;

Figs. 13 and 14 are fragmentary perspective views of bucket control group and lower power cut-off mechanism; and Fig. 15 is a schematic wiring diagram of the motor starting safety switch.

Figure 1:
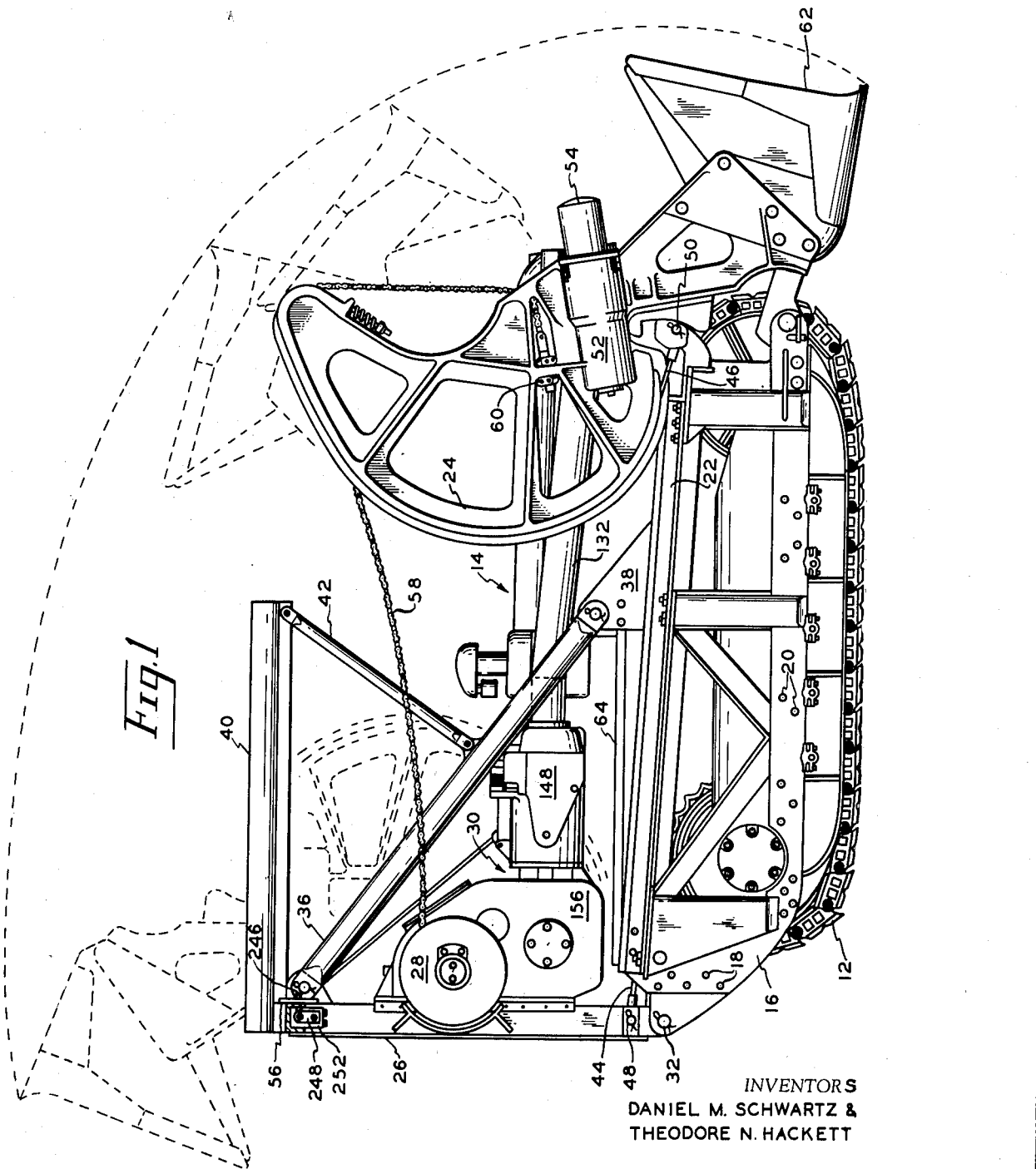
Fig. 1 is a right side elevation of the overhead material handling machine of the invention.
Figure 2:
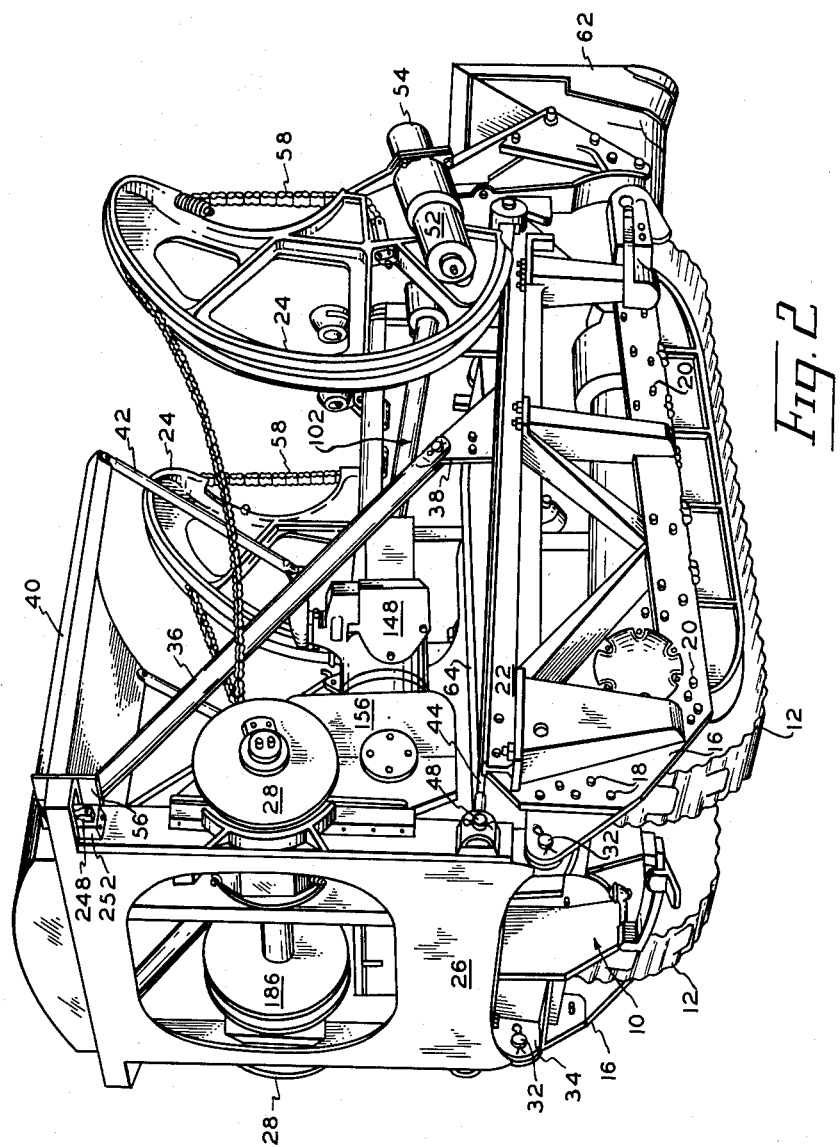
Fig. 2 is a perspective view from the right rear of the machine of the invention.
Figure 3:
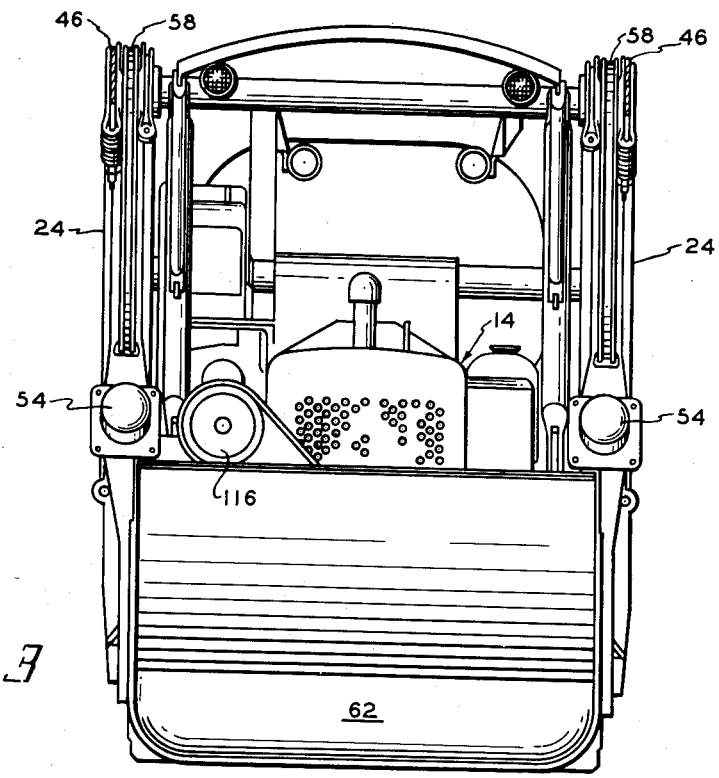
Fig. 3 is a front view of the machine shown in Fig. 1.

With reference to the illustrative embodiments of the invention and in particular to Figs. 1 through 4, there is shown a material handling machine embodying the principles of the invention which generally comprise a main frame or body 10 mounted on crawler or self-laying track units 12. At the forward end of the frame 10 is the power plant generally designated 14.

The main frame 10 carries the material handling superstructure and an overhead bucket assembly.

In the illustrated form of the invention the material handling superstructure and the overhead bucket assembly are suspended from the base of the main frame of the machine affording maximum stability during material handling under a wide variety of conditions.

The superstructure of the material handling machine generally comprises a pair of frames 16, secured to each side of the main frame 10 of the loader, for example, by bolts 18 at the rear of frames 16 and by bolts 20 along the lower edges thereof. The upper edges of frames 16 carry the rails or tracks 22 which are engaged by the curved surfaces of the side frames 24 of the rocker structure.

Figure 4:
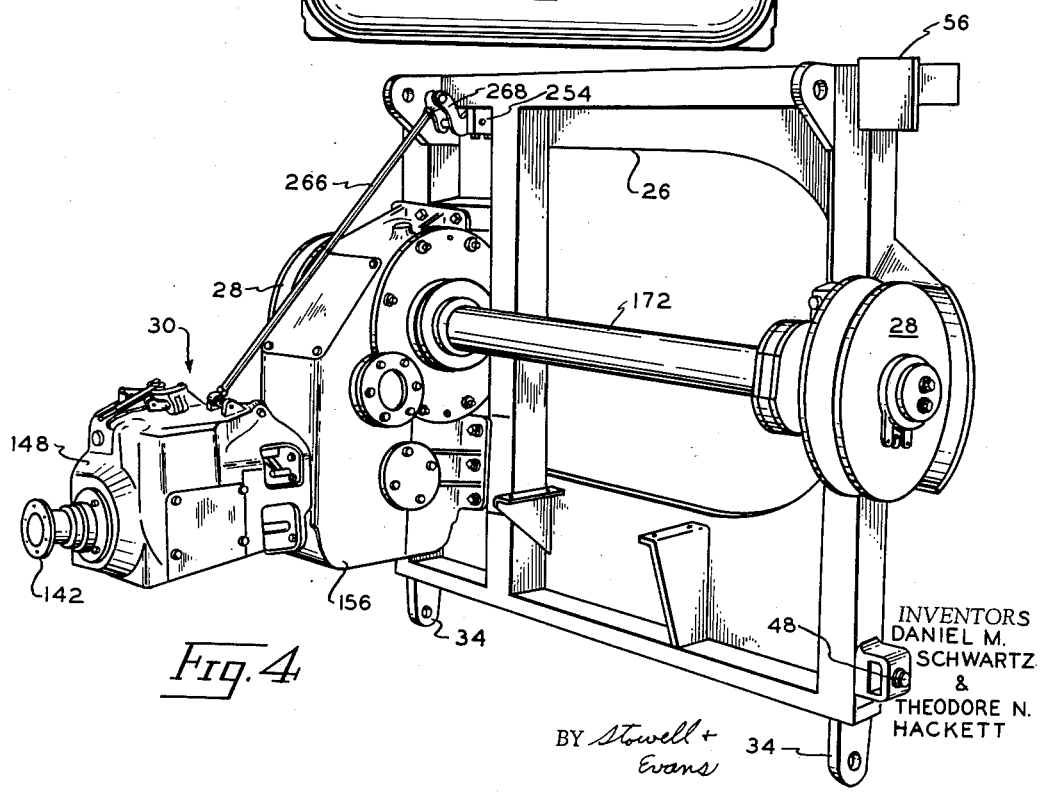
Fig. 4 is a perspective view showing the structural details of the bumper frame, and bucket control and drive mechanism.
Figure 14:
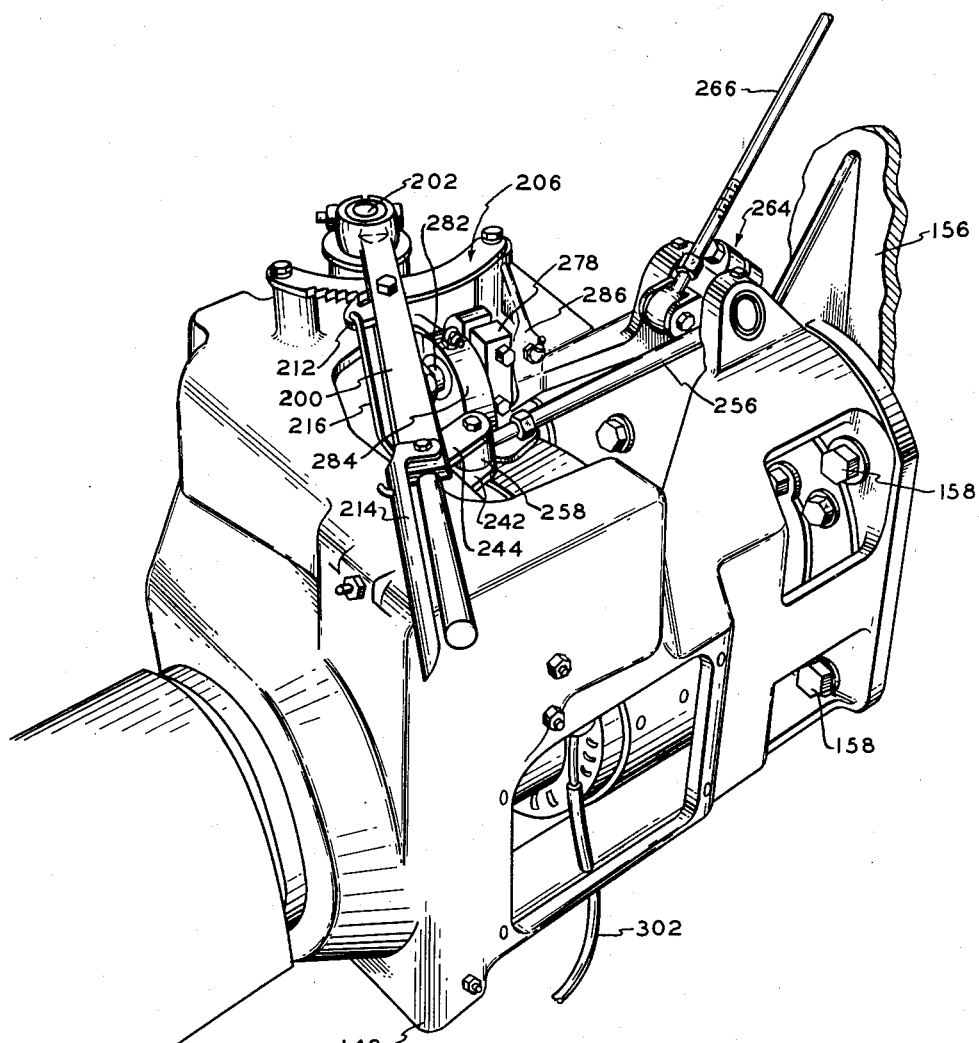

A bumper frame 26, which also serves as a support for the overhead bucket reels 28, and the bucket drive assembly 30, as clearly shown in Fig. 4 of the drawings, is pin-connected by pins 32 at its lower corners 34, to the side frames 16.

A pair of bumper struts 36, one for each side of the loader, are pin-connected at their extremities to support brackets 38 secured to frames 16 and to the upper corners of bumper frame 26. A roof 40 is supported at the rear from the top of bumper frame 26 and at the front by roof struts 42.

The overhead bucket assembly of the material handling machine is of the overhead rocker type. The side frames 24 of the rocker structure have curved lower surfaces for rolling engagement with the rails or tracks 22. The curved surfaces have inboard and outboard grooves to receive guide cables 44 and 46, the ends of which are connected to reverse manner to the rocker structure and the material handling superstructure. Cables 44 are attached to the bumper frame 26 at 48 and cables 46 to the forward ends of frame 16 at 50.

Cable connections 48 and 50 are pin-connections to allow the cables to wrap around the rocker frames 24 without distortion, and are located substantially at the rail height whereby the effective length of the cables are not changed as the rocker frames are rolled during the digging-discharge cycle.

In the wide section of the rocker frames are mounted bumpers 52 which are designed to absorb the high discharge momentum of the rocker bucket, without causing the front end of the machine to lift upwardly.

In the dumping position the spring-loaded pistons 54 of the bumper assemblies contact bumper plates 56 rigidly secured to the bumper frame 26.

Flat chains or cables 58 are attached at one end to the bucket reels 28 and the other ends are secured to the rocker assembly by chain end bolts 60, whereby rotation of reels 28 raises and lowers the shovel bucket 62. The shape of the curved surfaces of rockers 24, and the increase in the effective diameter of reels 28 as chains 58 wind upon them, are designed to give maximum digging thrust at reduced speeds in one position of the shovel bucket and maximum discharge velocity in another with a minimum horsepower requirement throughout the digging-discharge cycle.

From the foregoing description of the loader superstructure and overhead bucket assembly it will be seen that a compact and rugged assembly is provided which facilitates assemblage of the material handling machine, and simplifies and speeds repairs of the crawler treads and crawler drive mechanism. For example, to remove the side frames 16 which, as hereinbefore described, support the entire material handling assembly of the loader, the rocker arm chains 58 are disconnected at bolts 60 with the shovel bucket resting on the ground, and the pin-connections 48 and 50 of guide cables 44 and 46 are removed enabling the tractor to be driven out from under the rocker frames 24. Next the lower pins connecting the bumper struts 36 to support brackets 38 are removed and the bumper frame 26 allowed to lean forward until the housing of the bucket drive assembly 30 rests on the fender 64 of the tractor. With the bucket assembly removed and bumper frame 26 supported on the fender 64, the whole support frames 16 can then be unbolted at 18 and 20 and removed without removing or disturbing any other parts of the material handling machine.

The overhead bucket assembly elevating mechanism is driven by the vehicle prime mover through a front power take-off. The power connections between the front power take-off and the bucket reels 28 generally comprise: a stub drive shaft assembly 100, a universal joint drive shaft 102, brake and clutch assembly 104 and the gear drive assembly 106, shown respectively in Figs. 5, 6, 7, 8 and 9 of the drawings.

The stub drive shaft assembly 100 is mounted by bolts 108 to the right-front end of the main frame 10 of the material handling machine. This assembly generally comprises a stub shaft 110, journalled in bearings 114 carried in the ends of the stub shaft housing 112. A sheave 116 is secured to the forward end of the stub shaft by bushing 118 and key 120, while the other end of the stub shaft is adapted to be keyed to the companion flange 124, of flange yoke coupling 126, of the universal drive shaft assembly 102. Sheave 116 is adapted to receive a plurality of V-belts 117, which are driven from a similar sheave, not shown in the drawings, connected to the front power take-off of the vehicle prime mover. Bearings 114 are lubricated through a grease fitting 128 and both ends of the stub shaft housing are provided with oil seals 130.

Universal joint drive shaft assembly 102 connects the stub drive assembly 100 with the bucket clutch and brake group 104. This assembly generally comprises a main drive shaft 134 provided with flange yoke couplings 126 and 136, journalled at the ends thereof in center cross bearings 138 and 140, respectively. The companion flange 142 of flange yoke 136 is adapted to receive the clutch shaft 144 of the clutch and brake assembly 104. The drive shaft assembly may be provided with a protective sheath 132 as shown in Fig. 1 of the drawings.

The clutch and brake assembly 104 is mounted in a housing 148, which housing is in turn bolted to the reduction gear casing 156 by bolts 158. The bucket drive clutch is of a conventional design comprising a cone assembly 160 and a driving plate assembly 162 journalled in bearing 150 and 151, and a drive spider assembly 164. The periphery of the spider drum provides the braking surface for brake band 166.

Keyed to the rearward end of the drive spider is shaft 168 of the bevel pinion gear 170.

Pinion gear 170 drives the bucket chain reel cross shaft 172, through ring gear 174, and a gear train comprising gears 176, 178, 180 and 182, all of which are journalled in bearings carried by the gear housing 156. The paired chain reels 28, provided with chain anchor pins 184, are keyed to the ends of the cross shaft 172. A hoist drum 186, shown in Fig. 1 of the drawings, may be secured to this cross shaft along with the bucket reels 28 on installations where it is desirable to operate, for example, a scraper drag-line from the material handling machine. The hoist drum 186 shown in the drawings is for a single rope or cable; however, a multiple drum may be provided along with suitable clutches.

In Figs. 4 and 10 through 14 of the drawings there is shown the operating and power cut-off mechanism for the overhead bucket assembly.

In general, the bucket control mechanism is operated by a single control handle 200. Movement of the control handle in one direction from the neutral position engages and locks the brake 166 of the overhead bucket assembly, and movement of the control handle in the opposite direction engages the bucket clutch 104. The clutch and brake engaging positions of the control handle are mutually exclusive whereby, when the brake is in the engaged position, the clutch is disengaged and the bucket is prevented from raising or dropping. When the clutch is being engaged, the brake mechanism is moved in a direction to further effectuate its release. To further simplify the bucket operating procedure a power cut-off device is provided to override the clutch engaging mechanism when the shovel bucket reaches the material discharge position. Thus when the bucket engages the bumper support the bucket drive is automatically disengaged allowing the bucket to return to its digging position without attention by the operator of the loader. During the automatic disengagement of the clutch there is no movement of the control handle and the operator is free to arrest the drop of the bucket by engaging the brake, or reengage the clutch thereby driving the bucket again toward the discharge position.

These and other functions and advantages of the bucket operating mechanism will become apparent from the following detailed description of the control handle, the clutch and power cut-off mechanism, and the brake mechanism respectively.

*Control handle*

Control handle 200 is keyed to vertical shaft 202 journalled in bearings 204 of the clutch housing 148. The handle is spring centered with respect to ratchet plate 206 by the centering spring 208, attached at one end to the clutch housing and adapted to engage the dependent pin 210 of the handle at the other end. A pawl 212, normally spring-urged toward the ratchet plate 206, is manually disengageable by means of lever 214 and lever rod 216. The control handle is pulled toward the rear by the operator to engage the bucket clutch, and pushed toward the forward end of the machine to engage the brake. In the clutch-engaging portion from neutral rearwardly, the ratchet plate 206 is without teeth, while in the brake engaging portion the ratchet plate is provided with ratchet teeth in order to lock the brake in the engaged position.

*Clutch operation*

At the lower end of shaft 202 is keyed lever 216, provided with two clevis portions 218 and 220. The lower clevis portion 218 is adapted to actuate the brake as is hereinafter described.

Pivotally mounted to the upper clevis portion 220 is the long arm 222 of bell crank 224, which constrains a rocking movement in yoke bar 226 through yoke rod 228 pivotally mounted in bearings 230 and 232 carried by the housing 148, lever 234 keyed at one end to the yoke rod and provided with a clevis portion 236 at the other end, and a short lever arm 238 pivotally mounted at one end in clevis 236 of lever 234 and at the other in clevis 240 of long arm 222 of the bell crank 224.

The yoke bar 226 actuates the sleeve collar 242 of the clutch cone assembly 160 shown in Fig. 7 of the drawings.

As is more clearly shown in Fig. 13 of the drawings it will be seen that the toggle joint, formed by the three pivot points of the long and short lever arms 222 and 238, is off center to the rear about 3/8" during normal operation and is restrained from buckling at the middle joint 240 by the power cut-off mechanism, which is connected to clevis portion 242 of the short arm 244 of bell crank 224.

*Power cut-off mechanism*

The power cut-off mechanism is adapted automatically to release the bucket drive clutch when the bucket contacts plunger 246 in the right hand bumper plate of bumper frame 26. Plunger 246 is pivoted to lever 248 which lever is keyed to cross shaft 250. Shaft 250 is journalled in bearing blocks 252 and 254 secured to the bumper frame 26 whereby, when the bucket arms contact the bumper plate, plunger 246 is driven rearwardly imparting a counter-clockwise rotation to cross shaft 250, which constrains a rocking movement in yoke bar 226 of the clutch assembly through yoke rod 228, lever 234, tie rod 238, bell crank 224, tie rod 256, which has universal joint connections 258 and 260 at each end connected to clevis portions 242 and 262 of bell cranks 224 and 264, respectively, and tie rod 266, connected at one end to the other arm of bell crank 264 and at the other end to the clevis portion of right angle lever 268 keyed to the cross shaft 250.

A coil spring 270, engaging at one end the bearing block 254 and at the other pin 272 of lever 268, urges plunger 246 into its forward position after the clutch has been released by the power cut-off mechanism, and if the control handle is held in the clutch engaging position, the coil spring 270 also urges the clutch toward the engaged position. It will thus be seen that if the operator keeps the control handle in the clutch engaged position, on installations where the coil spring 270 is strong enough, the clutch will be reengaged, driving the bucket and rocker arms up against the bumper frame and power cut-off plunger. This operation will be repeated as long as the control handle is retained in the clutch engaging position and provides a very satisfactory means for discharging sticky materials from the shovel bucket.

On installations where the spring 270 is not strong enough to reengage the bucket clutch, the clutch linkages and cut-off mechanism are restored to these original positions by returning the control handle to neutral.

From the foregoing description it will be seen that the power cut-off mechanism restrains the toggle joint of the clutch linkage from buckling, as the coil spring in the upper cut-off assembly resists any rearward movement of tie rod 256 which is connected to the rearward clevis portion 242 of the toggle joint. Thus rearward movement of the control handle moves the clutch linkages in substantially a straight line constraining a slight side movement in tie rod 256 where it joins clevis portion 242 of the toggle joint. Actuation of the clutch, or brake, by the control handle does not affect the power cut-off mechanism, other than this slight sideward displacement.

Assuming that the clutch has been engaged by the operator and the control handle is held in its rearward position, the bucket is raised and the rocker arm contacts the plunger 246, depressing it. This rotates shaft 250 and lever 268 against the resistance of coil spring 270. Rotation of lever 268 pulls the long tie rod 266 upwardly and pushes the short tie rod 256 through lever 264 and the toggle joint at clevis portion 242 toward the forward end of the machine. The toggle joint is thus moved off center toward the front of the loading machine, which movement rotates yoke shaft 228 disengaging the clutch, as the clevis connection at lever 216 is held stationary by the operator through control handle 200.

*Brake control mechanism*

Brake band 166 is adapted to engage the periphery of the drive spider drum 164 of the clutch assembly. One end of the brake band is rigidly attached to the clutch housing 148 by the bolt and brake band pin assembly 276, while the other end of the brake band is pivotally mounted from lever 278 by brake band pin 280. As is more clearly shown in Fig. 13 of the drawings the brake band supporting lever 278 is adjustably secured to shaft 282 journalled in bearings 284 and 286 supported in the clutch housing 148. Shaft 282 and lever 278 are pivoted by the movement of lever 216 keyed to shaft 202 of the control handle assembly through lever 288 keyed to shaft 282 and lever arm 290, which pivotally connects the clevis portion of this lever with the lower clevis portion 218 of lever 216.

To engage the brake, control handle 200 is pushed toward the forward end of the machine past the neutral position, rotating clevis portion 218 of lever 216 in a clockwise direction, which in turn rotates lever 278 in a clockwise direction tightening the brake band around the outside of the drive spider. When the brake is being engaged, the clutch mechanism is moved in a direction to further release the clutch.

Within the clutch housing 148 a safety switch 294 is provided on diesel-driven machines which are adapted to be started by an auxiliary internal combustion engine. This switch prevents starting of the auxiliary engine, when the bucket clutch is engaged, by grounding the magneto, through the switch engaging lug 296 carried by the yoke arm 226. In Fig. 15 of the drawings there is shown a circuit diagram of a typical ignition circuit which may be employed in conjunction with the safety switch 294. In the drawing, 298 is the magneto providing current to the spark plugs of the starting motor through cables 300. A grounding cable 302 from the magneto is connected to one terminal of the ignition switch 304 and safety switch 294. The other terminals of these switches are connected to the frame of the loader as the primary ground connections.

It is thus evident that current can only be supplied from the magneto to the starting motor when both the ignition switch and the clutch-actuated safety switch are open, thus preventing any accidents which may arise by unintentional operation of the overhead bucket structure when starting diesel-driven machines.

From the foregoing description of the invention, it will be seen that an improved material handling machine of the overhead rocker type is provided which is generally adaptable for handling bulk materials under a wide variety of conditions due to its compactness, ease of control and efficiency in operation. Other uses and advantages of the improved mobile material handling machine of the invention will be clearly apparent to those skilled in the art.

We claim:

1. In a mobile material handling vehicle including a main frame, a prime mover carried by the frame, and an overhead material handling structure mounted for rolling engagement on said frame from a depressed material gathering position at one end of the vehicle to an elevated material dumping position at the other end of the vehicle, drive means operatively connecting the prime mover to the overhead material handling structure, said drive means comprising a clutch unit including a driver member and a driven member, brake means for the driven clutch member, interdependent control means for said clutch and brake selectively operable to engage the clutch members and disengage the brake and to disengage the clutch members and engage the brake, said control means comprising a single manually operable control member pivotally movable back and forth between a clutch-engaged position and a brake-engaged position through an intermediate neutral clutch and brake-disengaged position, a first set of members connecting the brake means with said control member, a second set of members connecting the clutch unit with said control member, said second set of members including a pair of substantially rectilinear members having a pivotal joint therebetween and members actuated by the material handling structure in the elevated material dumping position to move said pair of members out of the rectilinear relation to disengage the clutch driver member from the driven clutch member when the control member is in the clutch-engaged position.

2. Driving control means for a material handling machine comprising a clutch unit including a driver member and a driven member, a brake member for the driven clutch member, interdependent control means for said clutch and brake selectively operable to engage the clutch members and disengage the brake and to disengage the clutch members and engage the brake, said interdependent control means including a manual control member, a first set of members connecting the brake member and the control member, a second set of members operatively connecting the clutch unit with said control member, said second set of members including a pair of substantially rectilinear members having a pivotal joint therebetween and means connected to said pair of rectilinear members operable externally and independently of the control member to constrain said pair of members out of rectilinear relationship.

3. Driving control means for a material handling machine comprising a clutch unit including a driver member and a driven member, a brake member for the driven clutch member, interdependent control means for said clutch and brake selectively operable to engage the clutch members and disengage the brake and to disengage the clutch members and engage the brake, said control means comprising a single manually operable control lever pivotally movable back and forth between a clutch engaged position and a brake engaged position, through an intermediate neutral clutch and brake disengaged position, spring means urging the manually operable control lever into the intermediate neutral position, means releasably holding the control lever in the brake-engaging, clutch-disengaging position, and power cut-off means operable externally and independently of the control lever to disengage the clutch driver member from the driven clutch member.

4. A mobile material handling vehicle comprising a main frame, a prime mover carried by the frame, an overhead material handling structure mounted for rolling engagement on said frame from a depressed material gathering position at one end of the vehicle to an elevated material dumping position at the other end of the vehicle, said material handling structure comprising paired rocker arms having curved surfaces adapted for rolling engagement on the vehicle frame, and a shovel bucket carried by the rocker arms, a bumper frame supported by the vehicle at its rearward end adapted to be engaged by the rocker arms in the material dumping position of the shovel bucket, drive means operatively connecting the prime mover to the overhead material handling structure, said drive means comprising a clutch unit including a driver member and a driven member, brake means for the driven clutch member, interdependent control means for said clutch and brake selectively operable to engage the clutch members and disengage the brake and to disengage the clutch members and engage the brake, said interdependent control means including a common manual control member pivotally mounted for movement between a brake engaged position and a clutch engaged position through a neutral clutch and brake disengaged position, a first set of members connecting the brake means with the control member, a second set of members connecting the clutch unit with the control member, said second set of members including power cut-off means on the bumper frame actuated by the material handling structure in the elevated material dumping position to disengage the clutch driver member from the driven clutch member.

5. A mobile material handling vehicle comprising a main frame, a prime mover carried by the frame, an overhead material handling structure mounted for rolling engagement on said frame from a depressed material gathering position at one end of the vehicle to an elevated material dumping position at the other end of the vehicle, said material handling structure comprising paired rocker arms having curved surfaces adapted for rolling engagement on the vehicle frame, and a shovel bucket carried by the rocker arms, drive means operatively connecting the prime mover to the overhead material handling structure, said drive means comprising a clutch unit including a driver member and a driven member, brake means for the driven clutch member, interdependent control means for said clutch and brake selectively operable to engage the clutch members and disengage the brake and to disengage the clutch members and engage the brake, said control means comprising a single manually operable control member pivotally movable back and forth between a clutch-engaged position and a brake-engaged position through an intermediate neutral clutch and brake disengaged position, a first set of members connecting the brake means with said control member, a second set of members connecting the clutch unit with said control member, said second set of members including a pair of substantially rectilinear members having a pivotal joint therebetween, and means normally constraining said pair of rectilinear members in a substantially rectilinear relation whereby movement of the control member is transmitted through the pivotal joint to the clutch unit, and means connected to said pair of rectilinear members operable by the material handling structure in the elevated material dumping position to constrain the pair of rectilinear members out of rectilinear relation to disengage the clutch driver member from the driven clutch member when the control member is in the clutch engage position.

6. In a mobile material handling machine including a main frame, a prime mover carried by the frame, and a material handling structure mounted on said frame and adapted for movement from a depressed material gathering position to an elevated material dumping position, drive means operatively connecting the prime mover to the material handling structure, said drive means comprising a clutch unit including a driver member and a driven member, brake means for the driven clutch member, interdependent control means for said clutch and brake selectively operable to engage the clutch members and disengage the brake and to disengage the clutch members and engage the brake, power cutoff means actuated by the material handling structure in the elevated material dumping position to disengage the clutch driver member from the driven clutch member, and members operatively connecting the control means and said clutch members, said members including a pair of substantially rectilinear members having a pivotal joint therebetween, and means normally constraining the pair of rectilinear members in rectilinear relation whereby movement of the control means is transmitted through the pivotal joint to operate the clutch members wherein the power cut-off means actuated by the material handling structure constrains said pair of members out of rectilinear relationship to disengage the clutch.

(References on following page)

References Cited in the file of this patent

UNITED STATES PATENTS

| | | |
|---|---|---|
| 486,848 | Burrell | Nov. 29, 1892 |
| 1,220,786 | Reece | Mar. 27, 1917 |
| 1,611,860 | Richey | Dec. 21, 1926 |
| 1,646,125 | Tuttle | Oct. 18, 1927 |
| 1,906,000 | Finlay et al. | Apr. 25, 1933 |
| 2,104,159 | Hemingway, Jr. | Jan. 4, 1938 |
| 2,322,487 | Toftey | June 22, 1943 |
| 2,387,434 | Fitch | Oct. 23, 1945 |
| 2,423,193 | Lawler | July 1, 1947 |
| 2,495,138 | Royle | Jan. 17, 1950 |
| 2,573,065 | Salemme | Oct. 30, 1951 |
| 2,577,071 | Connors | Dec. 4, 1951 |
| 2,619,207 | Smith | Nov. 25, 1952 |
| 2,622,715 | Probst | Dec. 23, 1952 |

FOREIGN PATENTS

| | | |
|---|---|---|
| 501,786 | Germany | July 7, 1930 |